United States Patent
Kanai

(10) Patent No.: US 7,079,155 B2
(45) Date of Patent: Jul. 18, 2006

(54) IMAGE DISPLAY DEVICE, IMAGE PROCESSING METHOD, PROGRAM, AND STORAGE MEDIUM

(75) Inventor: Masashi Kanai, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 317 days.

(21) Appl. No.: 10/386,433

(22) Filed: Mar. 13, 2003

(65) Prior Publication Data

US 2003/0234794 A1    Dec. 25, 2003

(30) Foreign Application Priority Data

Mar. 18, 2002    (JP)    ............ 2002-074245

(51) Int. Cl.
 G09G 5/02    (2006.01)
(52) U.S. Cl. .................. 345/600; 358/518
(58) Field of Classification Search ........ 345/600, 345/601, 604, 602; 358/1.8, 1.9, 518; 382/167
 See application file for complete search history.

(56) References Cited

U.S. PATENT DOCUMENTS

| | | | |
|---|---|---|---|
| 5,600,764 A * | 2/1997 | Kakutani | .............. 345/591 |
| 6,480,202 B1 | 11/2002 | Deguchi et al. | |
| 6,847,374 B1 * | 1/2005 | Matsuda | .............. 345/589 |
| 2002/0097907 A1 * | 7/2002 | Fukasawa | .............. 382/167 |
| 2002/0180999 A1 * | 12/2002 | Kanai | .............. 358/1.9 |
| 2003/0035157 A1 * | 2/2003 | Kanai | .............. 358/518 |
| 2003/0053088 A1 * | 3/2003 | Kanai et al. | .............. 358/1.9 |
| 2004/0036896 A1 * | 2/2004 | Yamauchi et al. | .............. 358/1.9 |

FOREIGN PATENT DOCUMENTS

| | | |
|---|---|---|
| EP | 1 178 672 A2 | 2/2002 |
| EP | 1 178 680 A2 | 2/2002 |
| JP | A-04-136925 | 5/1992 |
| JP | A 8-65701 | 3/1996 |
| JP | A 10-65930 | 3/1998 |
| JP | A-10-198793 | 7/1998 |
| JP | 11-205620 | 7/1999 |
| JP | A 11-175048 | 7/1999 |
| JP | A 2001-008045 | 1/2001 |
| JP | A-2001-014448 | 1/2001 |
| JP | A-2002-027272 | 1/2002 |
| JP | A-2002-041016 | 2/2002 |
| JP | A-2002-262304 | 9/2002 |
| WO | WO 99/23637 | 5/1999 |

* cited by examiner

Primary Examiner—Amare Mengistu
(74) Attorney, Agent, or Firm—Oliff & Berridge, PLC

(57) ABSTRACT

The purpose of the present invention is to provide an image display device, an image processing method, and a computer-readable medium which can perform proper color reproduction while saving memory capacity. The image display device of the present invention, which applies a desired image processing to an input image data so as to display an image, uses a first color corrector 110 to refer to a three-dimensional color correction table which matches a color characteristic of the image display device with a reference color characteristic based on a characteristic value of the image display device, and to apply desired color correction to the inputted image data. Then, the image display device uses second color correction means 120 to refer to a one-dimensional color correction table for correcting gradation according to an application circumstances, and applies desired color correction to the inputted image data.

11 Claims, 22 Drawing Sheets

IMAGE DISPLAY DEVICE, IMAGE PROCESSING METHOD, PROGRAM, AND STORAGE MEDIUM

BACKGROUND OF INVENTION

1. Field of Invention

The present invention relates to an image display device, an image processing method, a program, and a storage medium which apply desired color correction to an output image.

2. Description of the Related Art

Since a color reproduction area differs depending on the type of an image display device such as a projector, the colors of a displayed image may change. To prevent this problem, a processing referred to as a color matching is generally conducted to match a color characteristic of an image processing unit with a color characteristic of a general CRT monitor When the image display device such as a projector is used, it is important to reproduce an image intended by an author even when an external circumstances changes. Especially, it is difficult to reproduce colors properly without considering a case where the brightness or the color of an external illumination, or the color of a plane of projection changes as changes of the external circumstances.

A color correction table is generally used for these color matching and correction according to the external circumstances.

However, it is difficult for the image display device such as a projector to hold a large quantity of data in the color correction table due to a restriction on a memory capacity. Namely, since the individual projectors largely differ from one another, it is necessary to store color correction tables matched to the individual machines.

SUMMARY OF INVENTION

The present invention is devised to solve the problem above, and has a purpose of providing an image display device, an image processing method, a program, and a storage medium which properly perform color reproduction while saving the memory capacity.

According to one aspect of the present invention, an image display device for applying a desired image processing on inputted image data, and displaying an image, includes: a 1st color correction unit for applying desired color correction to the inputted image data while referring to a three-dimensional color correction table so as to match a color characteristic of the image display device with a reference color characteristic based on a characteristic value of the image display device; and a 2nd color correction unit for applying desired color correction to the inputted image data while referring to a one-dimensional color correction table for correcting gradation in accordance with an application circumstances.

According to the thus constructed image display device for applying a desired image processing on inputted image data, and displaying an image, desired color correction is applied to the inputted image data by a 1st color correction unit while referring to a three-dimensional color correction table so as to match a color characteristic of the image display device with a reference color characteristic based on a characteristic value of the image display device. By the 2nd color correction unit, desired color correction is applied to the inputted image data while referring to a one-dimensional color correction table for correcting gradation in accordance with an application circumstances.

According to the present invention, the image display device may Her include a 1st rewriting unit for rewriting the three-dimensional color correction table so as to allow the 1st color correction unit to correct color tone in accordance with an application circumstances.

According to the present invention, the image display device may further include a 2nd rewriting unit for rewriting the three-dimensional color correction table so as to allow the 1st color correction unit to correct grid point data in the tree-dimensional color correction table based on the characteristic value.

According to the present invention, the one-dimensional color correction table for the 2nd color correction unit may be used for correction for a change of brightness of external illumination.

According to the present invention, the three-dimensional color correction table for the 1st color correction unit may be used for correction for a change of color on a plane of projection.

According to the present invention, the three-dimensional color correction table for the 1st color correction unit may be used for correction for a change of color of an external illumination.

According to the present invention, the image display device may further include a unit for entering the characteristic value.

According to the present invention, the image display device may be a projector.

According to the present invention, the 2nd rewriting unit may not rewrite the grid point data when the characteristic value is a reference characteristic value.

According to the present invention, if the inputted image data are converted to the outside of a color gamut when the desired image processing is applied while referring to the three-dimensional color correction table rewritten by the 1st rewriting unit, the inputted image data may be converted to the inside of the color gamut by reducing correction amounts while the ratio of changes of individual color components are maintained.

According to another aspect of the present invention, an image processing method for applying a image processing on image data inputted to a display device, includes: a 1st color correction step for applying desired color correction to the inputted image data while referring to a three-dimensional color correction table so as to match a color characteristic of the image display device with a reference color characteristic based on a characteristic value of the image display device; and a 2nd color correction step for applying desired color correction to the inputted image data while referring to a one-dimensional color correction table for correcting gradation in accordance with an application circumstances According to another aspect of the present invention, a computer-readable medium has a program of instructions for execution by the computer to perform a image processing with respect to image data inputted to a display device, the program including: a 1st color correction processing for applying desired color correction to the inputted image data while referring to a three-dimensional color correction table so as to match a color characteristic of the image display device with a reference color characteristic based on a characteristic value of the image display device; and a 2nd color correction processing for applying desired color correction to the inputted image data while referring to a one-dimensional color correction table for correcting gradation in accordance with an application circumstances.

DESCRIPTION OF THE PREFERRED EMBODIMENT

The following section describes a preferred embodiment of the present invention while referring to drawings.

First Embodiment

System Structure

Figure 1:
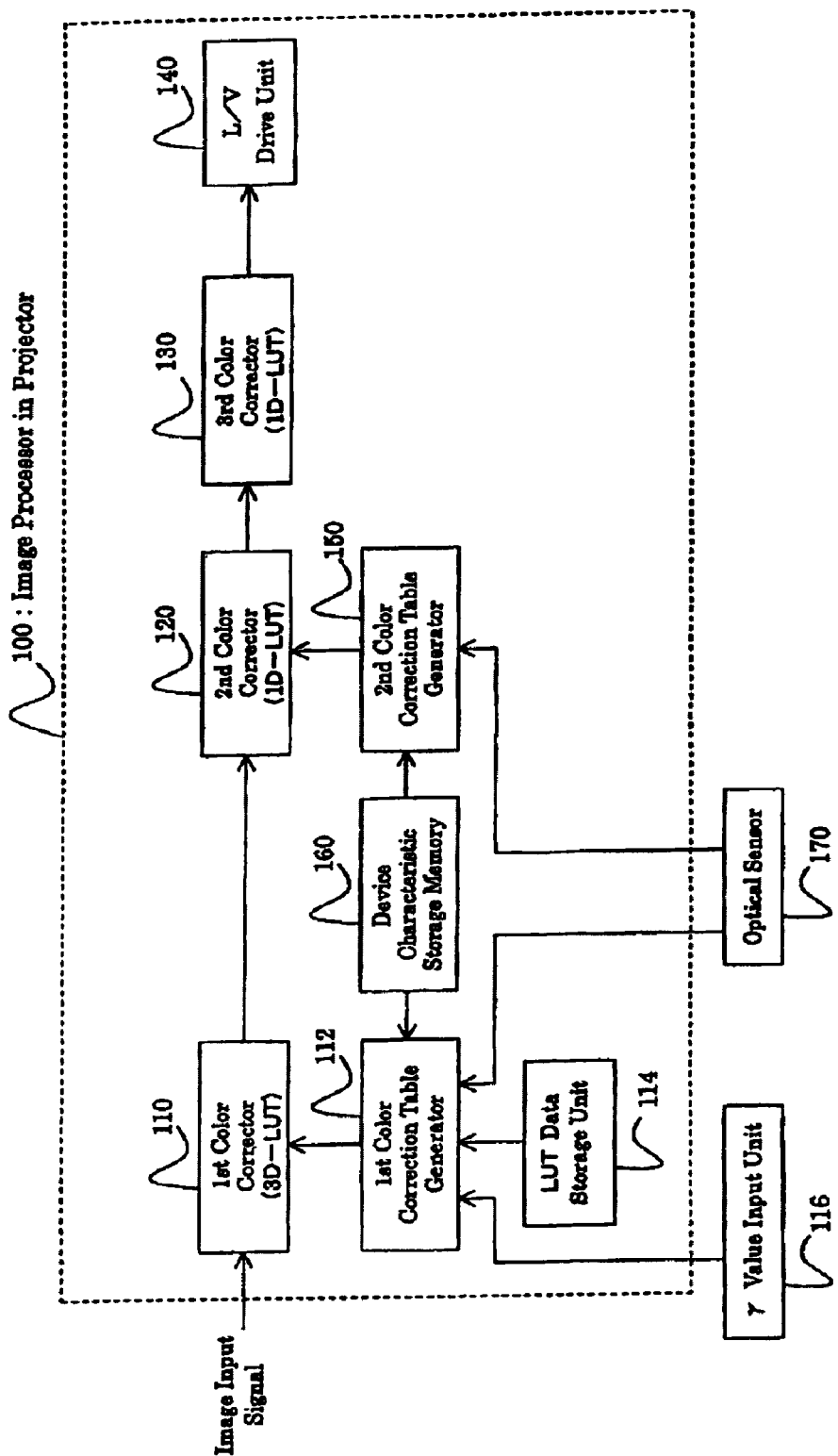
FIG. 1 is a function block diagram for an image processor in a projector according to an embodiment of the present invention.

FIG. 1 shows a function block diagram of an image processor 100 in a projector according to a first embodiment of an image display device of the present invention. The image display device of the present invention includes a CRT and an LCD display in addition to the projector The image processor 100 in the projector according to the first embodiment of the present invention is provided with a 1st color corrector 110 for correcting color characteristic of the projector according to a surrounding environment and color matching based on a color correction table (LUT) generated by a 1st color correction table generator 112, a 2nd color corrector 120 for correcting tone characteristic of the projector according to the surrounding environment based on a color correction table generated by a 2nd color correction table generator 150, a 3rd color corrector 130 for adjusting an output characteristic of a liquid crystal light valve, and an L/V (light valve) drive unit 140 for driving a liquid crystal light valve so as to project an image for display.

In addition, the image processor 100 is provided with a $\gamma$ value input unit 116 for entering a $\gamma$ value for the projector, a LUT data storage unit 114 for storing data (converted values and LUT data) and grid point data, while they are associated with one another, in the color correction table for generating a three-dimensional color correction table (3D-LUT) for the color matching and the color characteristic correction according to the surrounding environment, a device characteristic storage memory 160 for storing output characteristic information of the project in a reference environment, an optical sensor 170 for measuring luminance of light from the screen on which the projector and the external illumination reflected, and a 1st color correction table generator 112 for generating the three-dimensional color correction table for the color matching and the color characteristic correction according to the surrounding environment based on the $\gamma$ value entered from the $\gamma$ input unit 116, the data stored in the LUT data storage unit 114, the color value measured by the optical sensor 170, and the information stored in the device characteristic storage memory.

Further, the image processor 100 is provided with a 2nd color correction table generator 150 for generating a one-dimensional color correction table (1D-LUT) for correcting the tone characteristic according to the surrounding environment based on the color value measured by the optical sensor 170 and the information stored in the device characteristic storage memory.

In the projector of the first embodiment of the present invention, first, the 1st color corrector 110 applies the color matching and the color characteristic correction according to the surrounding environment to an image input signal supplied from a personal computer or the like while referring to the color correction table generated by the 1st color correction table generator 112. Then, the 2nd color corrector 120 refers to the color correction table generated by the 2nd color correction table generator 150, and then, applies tone characteristic correction according to the surrounding environment to the image signal applied with the color matching and the tone characteristic correction according to the surrounding environment. The 3rd color corrector 130 adjusts the image signal applied with the color correction while considering the output characteristic of the liquid crystal light valve. The L/V driving unit 140 derives the liquid crystal light valve based on this adjusted analog signal so as to project the image for display.

Processes Performed by the Image Processor 100

Processes such as a color correction table generation processing and an image processing performed by the image processor 100, which will be described below, are carried out by executing an image processing program stored in a program storage unit (not shown) provided in the projector 20. The program storage unit constitutes a medium which stores the image processing program. The image-processing program itself is also included in the scope of the present invention.

(1) Color Correction in 1st Color Corrector 110

Figure 2:
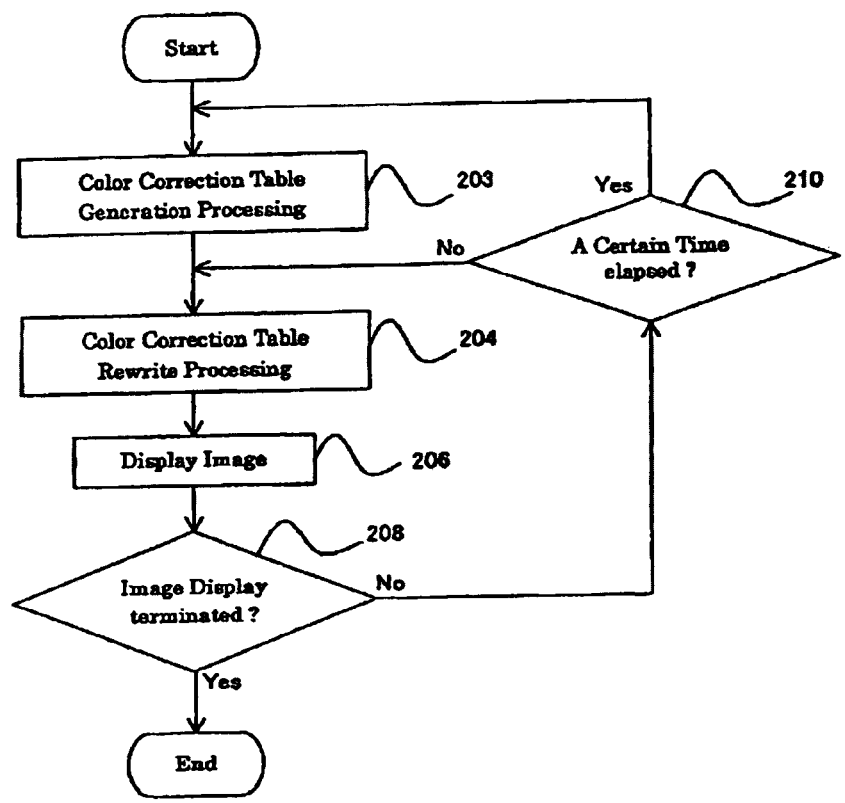
FIG. 2 is a flowchart describing the operation of a 1st color corrector 110 and a 2nd color corrector 120 in the projector of an embodiment of the present invention.

The following section describes the operation of the 1st color corrector 110 in the projector according to an embodiment of the present invention while referring to FIG. 2.

First, before the projector of the present invention is used, the color correction table is generated, and then, is stored in the LUT data storage unit 114 in advance (step 203). The following section details the generation of the color correction table while referring to FIG. 22.

When the use of the projector according to the present invention is started, there is performed a color correction table generation/rewrite processing by the 1st color correction table generator 112 Cp 204). As to the color correction table generation/rewrite processing, it will be described below in detail with reference to FIG. 3.

After the color correction table generation/rewrite processing, there is made image display on the basis of the image signal color corrected by the 1st color corrector 110 and with reference to the rewritten color correction table (step 206). If the image display is not terminated (step 208, No) and if a certain time has not elapsed from the end of the last-time color correction table generation/rewrite processing (step 210, No), the state of image display in step 206 continues. On the other hand, if the display of image is not terminated (step 208, No) and a certain time has elapsed from the termination of the last-time color correction table generation/rewrite processing (step 210, Yes), the color correction table generation/rewrite processing is again performed to make the color tone correction according to the application circumstances with the lapse of time (step 204) and there is made image display (step 206). According to the present invention, since the color correction table is rewritten at every certain time to perform the color tone correction according to the application circumstances, an appropriate color reproduction is ensured even if the color of external illumination or the color of the plane of projection changes.

In the case where the display of image is terminated, for example by turning off a power supply of the projector (step 208, Yes), the processing is ended.

(1-0) Color Correction Table Generation Processing

Figure 22:
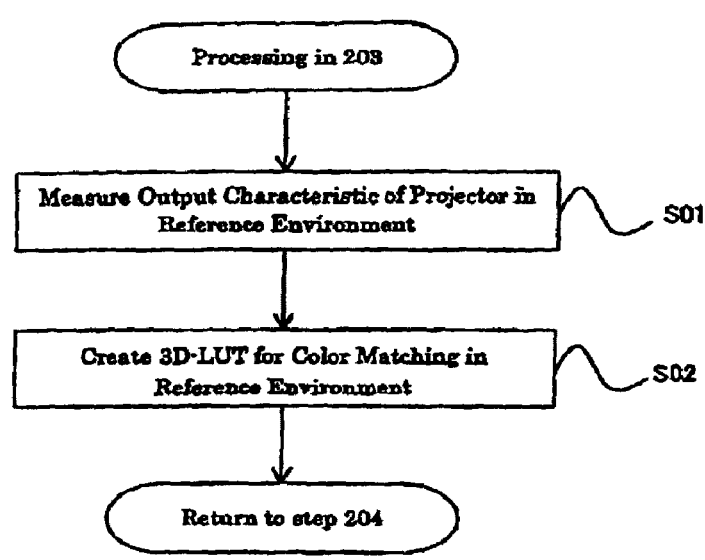
FIG. 22 is a flowchart describing the generation of a color correction table for the projector (processing in step 203 in FIG. 2) according to an embodiment of the present invention.

Next, with reference to FIG. 22, a description will be given about the color correction table generation processing (the processing in step 203 in FIG. 2) which is performed by the projector according to an embodiment of the present Invention.

(1-0-1) Measuring Output Characteristic of Projector in Reference Circumstances

Before the 1st color correction table generator 112 rewrites the color correction table, tristimulus values of RGBK are measured in the reference circumstances in advance. The reference circumstances means a case where output light from the projector is projected on a reference screen in a dark room.

When a measured color is (R, G, B)=(255,0,0), the measured values are set to $X_{RO}$, $Y_{RO}$, and $Z_{RO}$, when a measured color is (R, G, B)=(0,255,0), the measured values are set to $X_{GO}$, $Y_{GO}$, and $Z_{GO}$, when a measured color is (R, G, B)=(0,0,255), the measured values are set to $X_{BO}$, $Y_{BO}$, and $Z_{BO}$, and when a measured color is (R, G, B)=(0,0,0), the measured values are set to $X_{KO}$, $Y_{KO}$, and $Z_{KO}$.

An output characteristic matrix $M_0$ for the projector in the reference circumstances is obtained based on these measured values, and is stored in the device characteristic storage memory 160. The output characteristic matrix $M_0$ for the projector in the reference circumstances is represented in the following equation.

$$M_0 = \begin{pmatrix} X_{RO}-X_{KO} & X_{GO}-X_{KO} & X_{BO}-X_{KO} \\ Y_{RO}-Y_{KO} & Y_{GO}-Y_{KO} & Y_{BO}-Y_{KO} \\ Z_{RO}-Z_{KO} & Z_{GO}-Z_{KO} & Z_{BO}-Z_{KO} \end{pmatrix}$$ [Expression 1]

(1-0-2) Creating 3D-LUT for Color Matching in Reference Circumstances

The 3D-LUT for matching the output characteristic of the projector with a predetermined color space is created, and-then, is stored in the LUT data storage unit 114 in advance. The method for creating this 3D-LUT is arbitrary, and the non-conversion 3D-LUT may be used when the matching is not required The output values of the 3D-LUT for the color matching are represented as:

{R(Rin, Gin, Bin), G(Rin, Gin, Bin), B(Rin, Gin, Bin)} where Rin, Gin, and Bin are the entered value.

Example of LUT Data Generation

Figure 4:
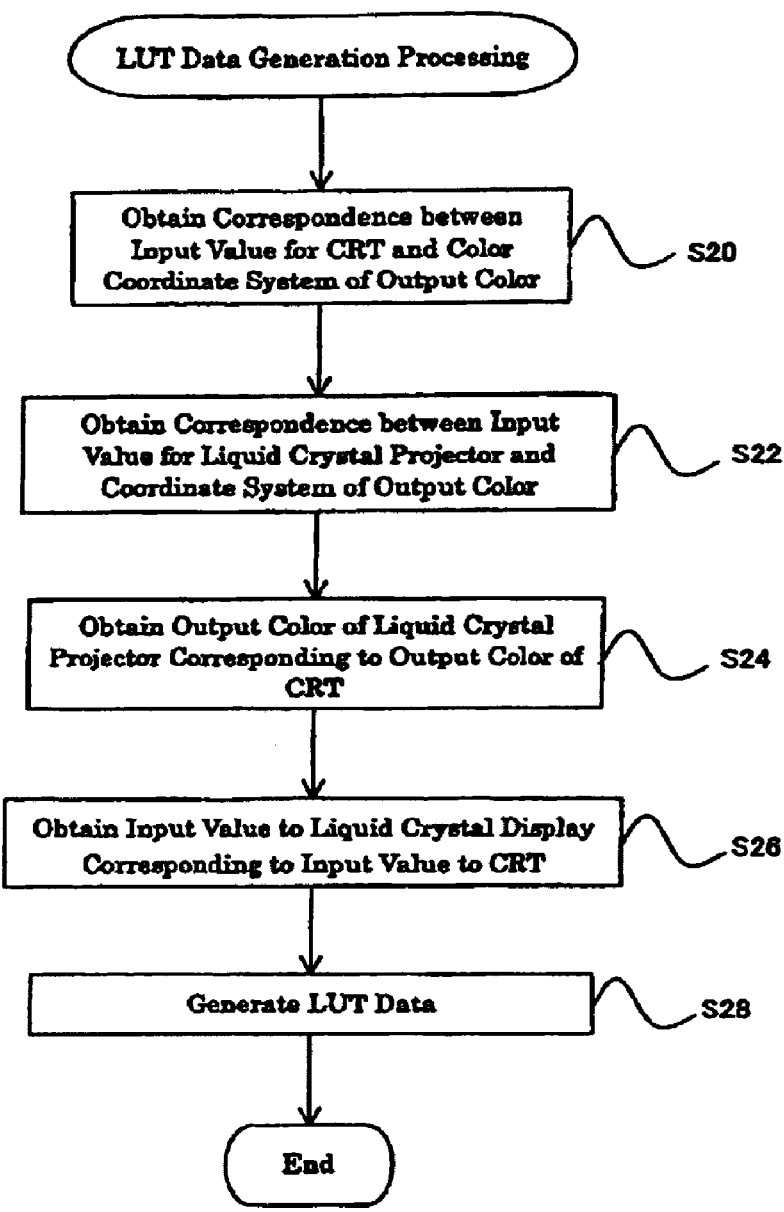
FIG. 4 is a flowchart describing generation of LUT data stored in an LUT data storage unit 114.

The following section describes an example of generating the LUT data stored in the LUT data storage unit 114 while referring to FIG. 4. In this embodiment, a case where the color characteristic of the projector is matched with the color characteristic (the reference color characteristic) of the CRT is described First, a correspondence between an input value $R_C G_C B_C$) for the CRT and a color coordinate ($X_C Y_C Z_C$, $L_C^* a_C^* b_C^*$) of the output color is obtained (S20). Correspondences for typical colors are obtained by actually presenting a color from the CRT, and then, measuring the presented color, and the correspondences for the remaining colors are obtained by interpolation calculation or the like. Then, a correspondence between an input value ($R_P G_P B_P$) for the projector and a color coordinate ($X_P Y_P Z_P$, $L_P^* a_P^* b_P^*$) of the output color is obtained (S22). In the same way, correspondences for typical colors are obtained by actually presenting a color from the projector, and then, measuring the presented color, and the correspondences for the remaining colors are obtained by interpolation calculation or the like.

Figure 6:
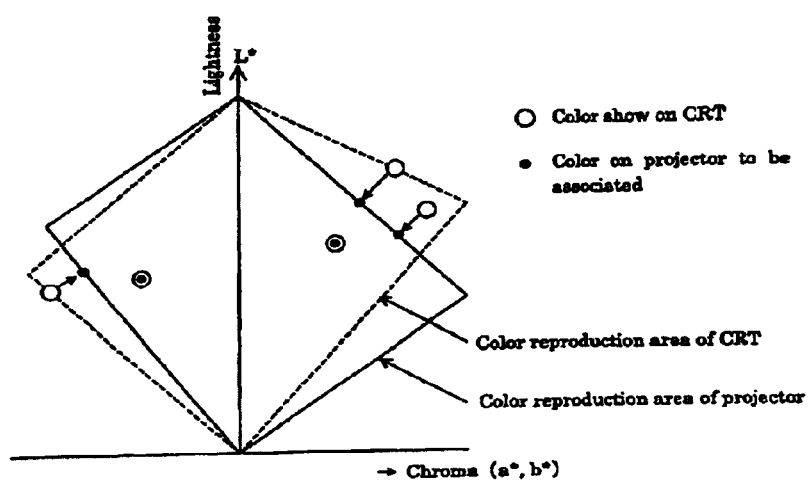
FIG. 6 describes correspondence between a color of a CRT and a color of the projector.

Then, the output color ($L_P^* a_P^* b_P^*$) from the liquid crystal projector corresponding to the output color ($L_C^* a_C^* b_C^*$) from the CRT is determined (S24). Usually, the same colors are associated with each other (($L_C^*=L_P^*$, $a_C^*=a_P^*$, $b_C^*=b_P^*$)). However, when the projector cannot present the output color ($T_C^* a_C^* b_C^*$) from the CRT, a color which is relatively close to that color (a color having the same hue, and the minimum distance on the color coordinate, for example) is associated as shown in FIG. 6.

Figure 5:
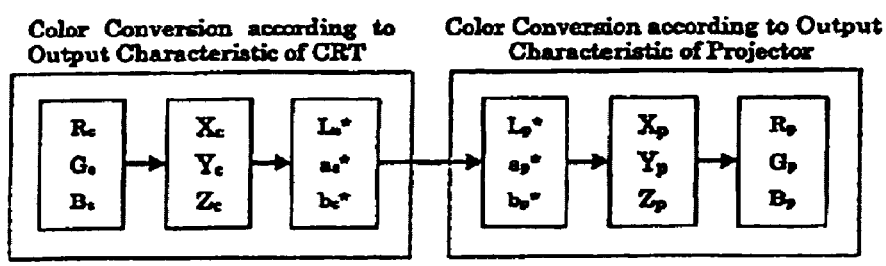
FIG. 5 describes generation of the LUT data.

Then, $R_P G_P B_P$ values corresponding to individual $R_C G_C B_C$ values are obtained so as to create the LUT data based on the correspondences obtained in S20 to S26 as shown in FIG. 5 (S28).

In the present embodiment, it is assumed that the LUT data generated as described above, and the grid point data are stored in the LUT data storage unit 114 in advance.

(1-1) Generation and Rewrite of Color Correction Table by 1st Color Correction Table Generator 112

Figure 3:
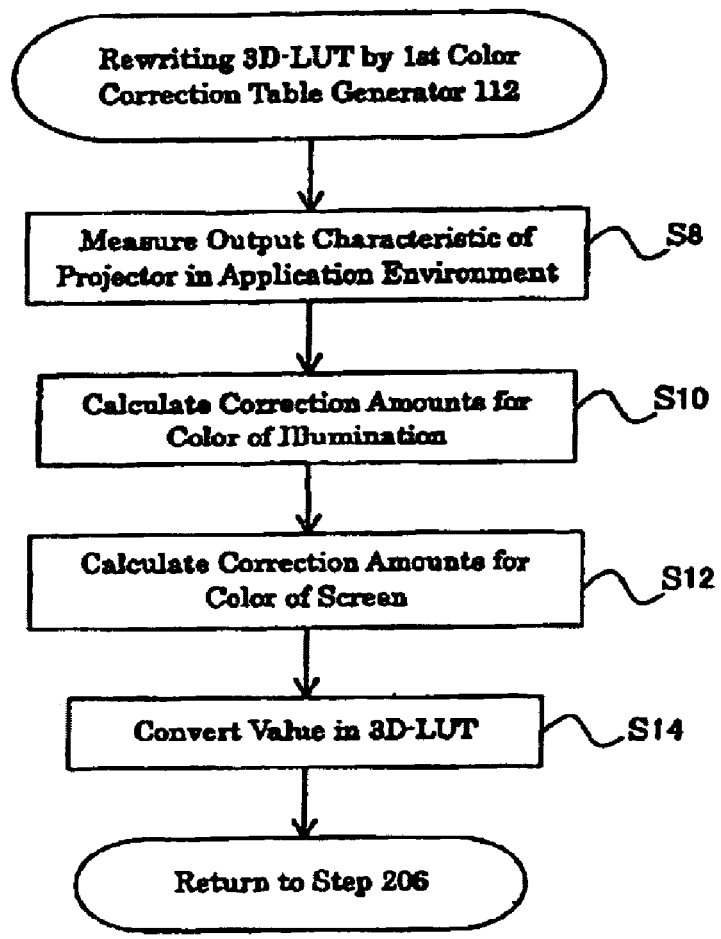
FIG. 3 is a flowchart describing generation of a color correction table by the 1st color correction table generator 112.

The following section describes generating and rewriting processes (processes in the step 204 in FIG. 2) for the color correction table by the 1st color correction table generator 112 in the projector (processing in the step 204 in FIG. 2) according to an embodiment of the present invention while referring to FIG. 3.

(1-1-1) Measuring Output Characteristic of Projector in Application Circumstances First, the txistimulus values of RGBK of the projector are measured in the application circumstances for generating and rewriting the color correction table by the 1st color correction table generator 112.

When a measures color is (R, G, B)=(255,0,0), the measured values are set to $X_R$, $Y_R$, and $Z_R$, when a measures color is CR, G, B)=(0,255,0), the measured values are set to $X_G$, $Y_G$, and $Z_G$, when a measures color is CR, G, B)=(0,0,255), the measured values are set to $X_B$, $Y_B$, and $Z_B$, and when a measures color is (R, G, B)=(0,0,0), the measured values are set to $X_K$, $Y_K$, and $Z_K$.

An output characteristic matrix M for the projector in the application circumstances is obtained based on these measured values, and is stored in the device characteristic storage memory 160. The output characteristic matrix M for the projector in the application circumstances is represented in the following equation.

$$M = \begin{pmatrix} X_R - X_K & X_G - X_K & X_B - X_K \\ Y_R - Y_k & Y_G - Y_K & Y_B - Y_K \\ Z_R - Z_K & Z_G - Z_K & Z_B - Z_K \end{pmatrix} \quad \text{[Expression 2]}$$

(1-1-2)

After the output characteristic of the projector is measured in the application circumstances, first, correction amounts for the color of the illumination (S10), and correction amounts for the color of the screen (the plane of projection) (S12) are calculated in the process for generating and rewriting the color correction table by the 1st color correction table generator 112 as shown in FIG. 3. Then, the values in the three-dimensional color correction table are converted based on the result of these calculations (S14). The individual processes in S10 to S14 are detailed later.

(1-1-2-1) Calculating Correction Amounts for Color of Illumination (S10)

Figure 7:
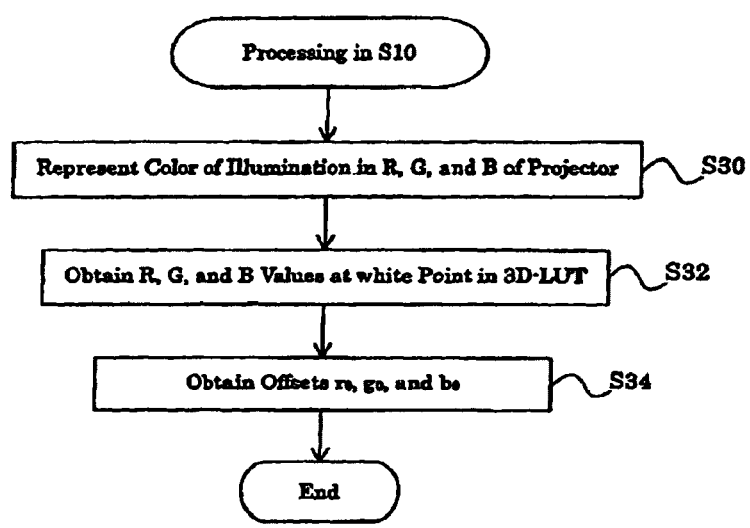
FIG. 7 is a flowchart describing calculation of correction amounts for a color of illumination in S10 in FIG. 3.

The following section describes calculation of the correction amounts for the color of the illumination in S10 in FIG. 3 while referring to FIG. 7. In this process, a change of an output color characteristic of the projector due to the color of the illumination is corrected by correcting offsets of the individual colors of R, G, and B of the projector. More specifically, a difference between the color of the illumination and white of the projector is obtained, and then the amounts of the offsets are adjusted by the difference.

As shown in FIG. 7, first, the color of the illumination is represented in the RGB of the projector in the calculation of the correction amounts for the color of the illumination in S10 in FIG. 3 (S30). The color of the illumination (corresponding to a value when the black of the projector is measured in the application circumstances) is represented by the following equation when it is represented in a mixture of the R, G, and B of the projector:

$$\begin{pmatrix} r_K \\ g_K \\ b_K \end{pmatrix} = M^{-1} \begin{pmatrix} X_K \\ Y_K \\ Z_K \end{pmatrix} \quad \text{[Expression 3]}$$

Then, the R, G and B values for a white point in the 3D-LUT is read out, and luminance ratios of the R, G, and B values at the white point are obtained in the calculation of the correction amounts for the color of the illumination in S10 in FIG. 3 (S32). The R, G, and B values at the white point, $r_{W0}$, $g_{W0}$, and $b_{W0}$, are:

$$r_{W0} = \{R(255,0,0)/255\}^\gamma$$

$$g_{W0} = \{G(0,255,2)/255\}^\gamma$$

$$b_{W0} = \{B(0,0,255)/255\}^\gamma$$

$\gamma$ is a value for representing an output gradation characteristic of the projector, and is entered from the $\gamma$ value input unit 116.

Based on the procedure above, offset correction amounts $r_0$, $g_0$, and $b_0$ are obtained in the calculation of the correction amounts of the illumination color in S10 in FIG. 3 (834).

As the following equation indicates, differences between $r_K$, $g_K$, and $b_K$ and $r_{W0}$, $g_{W0}$, and $b_{W0}$ are obtained so as to make them as the offset correction amounts.

$$\begin{pmatrix} r_0 \\ g_0 \\ b_0 \end{pmatrix} = \alpha_0 \left\{ g_k / g_{wo} \begin{pmatrix} r_{wo} \\ g_{wo} \\ b_{wo} \end{pmatrix} - \begin{pmatrix} r_K \\ g_K \\ b_K \end{pmatrix} \right\} \quad \text{[Expression 4]}$$

In the equation, $\alpha_0$ is a parameter for adjusting degree of applying the correction, and a proper value for it ranges from 0.0 to 0.5.

This is the end of the processing in S10.

(1-1-2-2) Calculating Correction Amounts for Screen Color (S12)

Figure 8:
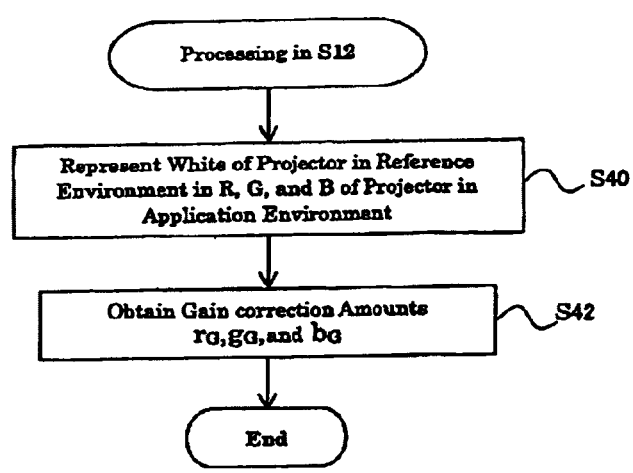
FIG. 8 is a flowchart describing calculation of correction amounts for a color of a screen in S12 in FIG. 3.

The following section describes calculation of the correction amounts for the color of the screen in S12 in FIG. 3 while referring to FIG. 8. A change of an output color characteristic of the projector due to the color of the screen is corrected by correcting the gains of the individual RGB colors of the projector. Specifically, a gain, which is for representing the white of the projector in the reference circumstances by using the R, G, and B in the application circumstances, is obtained In the calculation of the correction amounts for the color of the screen in S12 in FIG. 3, as shown in FIG. 8, first, the color of the white of the projector ($r_W$, $g_W$, $b_W$) in the reference circumstances is represented by the R, G, and B of the projector in the application circumstance (S40). Namely, luminance ratios of the R, G, and B are obtained if the luminance ratios of the R, G, and B reproduce the same color in the application circumstance with the white of the projector in the reference circumstances as follows:

$$\begin{pmatrix} r_w \\ g_w \\ b_w \end{pmatrix} = M^{-1} M_0 \begin{pmatrix} r_{w0} \\ g_{w0} \\ b_{w0} \end{pmatrix} \quad \text{[Expression 5]}$$

Then, gain correction amounts $r_G$, $g_G$, and $b_G$ are obtained in the calculation of the correction amounts for the color of the screen in S12 in FIG. 3 (S42). The gain correction amounts are obtained as follows from $r_W$, $g_W$, and $b_W$ and $r_{W0}$, $g_{W0}$, and $b_{W0}$.

$r_G=1+\alpha_G\{p_r/\max(p_r, p_g, p_b)-1\}$, $p_r=r_{W0}/r_W$ $g_G=1+\alpha_G\{p_g/\max(p_r, p_g, p_b)-1\}$, $p_g=g_{W0}/g_W$ $b_G=1+\alpha_G\{p_b/\max(p_r, p_g, p_b)-1\}$, $p_b=b_{W0}/b_W$ In the equation, $\alpha_G$ is a parameter for adjusting degree of applying the correction, and a proper value for it ranges from 0.5 to 1.0.

This is the end of the processing in S12.

(1-1-2-3) Converting Values in Three-dimensional Color Correction Table (3D-LUT) (S14)

Figure 9:
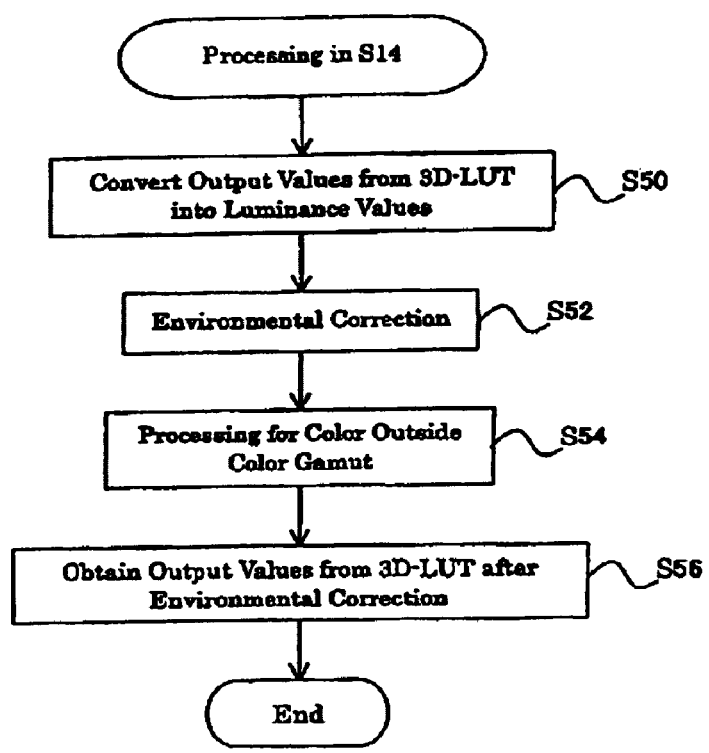
FIG. 9 is a flowchart describing conversion of values in a 3D-LUT in S14 in FIG. 3.

The following section describes conversion of the values in the 3D-LUT in S14 in FIG. 3 while referring to FIG. 9. In this processing, a correction corresponding to a change of the circumstances is added to the output values for the individual grid points of the 3D-LUT stored in the LUT? data storage unit 114 to create a new correction table.

As shown in FIG. 9, the output values are read out from the individual grid points in the 3D-LUT stored in the LUT data storage unit 114, and are converted into luminance values in the conversion of the values in the 3D-LUT in S14 in FIG. 3 (S50). The converted luminance values (r), (g), and (b) are:

$r=\{R(Rin, Gin, Bin)/255\}^\gamma$ $g=\{G(Rin, Gin, Bin)/255\}^\gamma$ $b=\{B(Rin, Gin, Bin)/255\}^\gamma$ Then, circumstantial correction is applied in the conversion of the values in the 3D-LUT in S14 in FIG. 3 (S52). The correction amounts obtained in S10 and S12 are used to correct the gain and the offset of the values in the 3D-LUT. The values r', g', and b' after the correction are:

$r'=r_G r+r_0$ $g'=g_G g+g_0$ $b'=b_G b+b_0$

Then, a color outside the color gamut is processed in the conversion of the values in the 3D-LUT in S14 in FIG. 3 (S54).

The values of r', g', and b' obtained in S52 may be outside the color gamut (r'<0 or r'>1, for example) after the correction. When the values after the correction are outside the color gamut, the correction amounts are adjusted such that they stay inside the color gamut. The adjusting of the correction amounts is performed while the R, G, and B are mutually correlated. Specifically, the following equations are used to process the color outside the color gamut.

$$a_r = \begin{cases} r/(r-r') & (r' < 0) \\ 1 & (0 \leq r' \leq 1) \\ (1-r')/(r'-r) & (r' > 1) \end{cases}$$ [Expression 6]

The same process applies to $a_g$ and $a_b$.

$$\begin{pmatrix} r'' \\ g'' \\ b'' \end{pmatrix} = \begin{pmatrix} r \\ g \\ b \end{pmatrix} + \min(a_r, a_g, a_b) \begin{pmatrix} r'-r \\ g'-g \\ b'-b \end{pmatrix}$$ [Expression 7]

Further, the output values from the 3D-LUT after the circumstantial correction are obtained in the conversion of the values in the 3D-LUT in S14 in FIG. 3 (S56). The final output values R'(Rin, Gin, Bin), G'(Rin, Gin, Bin), and B'(Rin, Gin, Bin) from the 3D-LUT added with colons corresponding to the circumstantial change are:

$R'(Rin, Gin, Bin)=255(r'')^\gamma$ $G'(Rin, Gin, Bin)=255(g'')^\gamma$ $B'(Rin, Gin, Bin)=255(b'')^\gamma$ This is the end of the processing in S14, and the procedure returns to processing in the step 206 in FIG. 2.

(2) Color Correction in 2nd Color Corrector 120 (Gradation Correction According to Application Circumstances)

The operation of the 2nd color corrector 120 in the projector according to an embodiment of the present invention is similar to the operation of the 1st color corrector 110 described while referring to FIG. 2. Thus, the following section describes the operation of the 2nd color corrector 120 while referring to FIG. 2.

When the operation of the projector of the present invention starts, the 2nd color correction table generator 150 generates/rewrites the color correction table (step 204). The following section details the generation/rewrite of the color correction table while referring to FIG. 10. It is possible to synchronously or independently conduct the generation/rewrite of the color correction table by the 1st color correction table generator 112 and the generation/rewrite of the color correction table by the 2nd color correction table generator 150.

After generating/rewriting the color correction table, an image is displayed based on an image signal with color correction by the 2nd color corrector 120 while referring to the rewritten color correction table (step 206). When the image display is not terminated (step 208, No), and a certain period has not passed since the last generation/correction of the color correction table (step 210, No), the display state of the image in the step 206 continues. On the other hand, when the image display is not terminated (step 208, No), and the certain period has passed since the last generation/correction of the color correction table (step 210, Yes), the color correction table is generated/rewritten so as to correct the gradation according to the application circumstances as time elapses (step 204), and the image is displayed (step 206). With the present invention, since the color correction table is rewritten at a certain time interval to correct the gradation according to the application circumstances, proper color reproduction is enabled even if the brightness of external illumination changes.

Then, when the display of the image is terminated by turning off the projector (step 208, Yes), the processing ends.

(2-1) Generation/rewrite of Color Correction Table by 2nd Color Correction Table Generator 150

Figure 10:
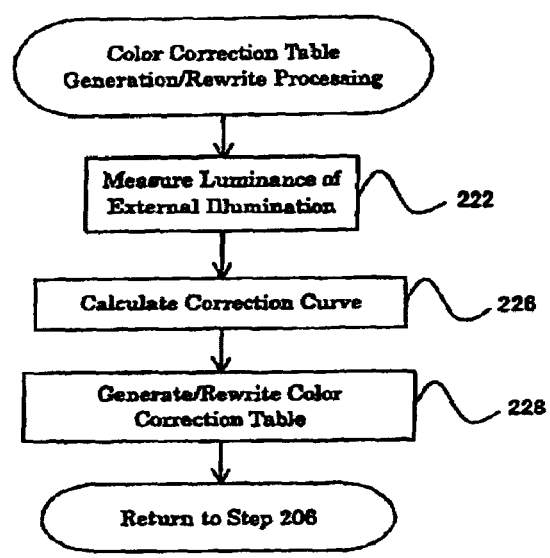
FIG. 10 is a flowchart describing generation/rewrite of a color correction table by a 2nd color correction table generator 150 in an embodiment of the present invention.

The following section describes generation/rewrite of the color correction table by the 2nd color correction table generator 150 (processing in the step 204 in FIG. 2) in the projector according to an embodiment of the present invention while referring to FIG. 10.

The projector (the image display device) 20 presents white (R=G=B=255 in gradation) in a dark room in the generation/rewrite of the color correction table, the optical sensor 170 measures the luminance of the reflected light from the screen 10, and the result is stored in the device characteristic storage memory 160 in advance.

Then, the luminance of reflected light on the screen from the external illumination is measured while the projector is not providing the output (step 222).

Then, a correction curve is calculated (step 226). The following section details the calculation of the correction curve while referring to FIG. 11. Then, a new one-dimensional color correction table is generated based on the calculated correction curve Then, the newly generated one-dimensional color correction table replaces the one-dimensional color correction table referred from the color corrector 120 (step 228).

Calculating Correction Curve

Figure 11:
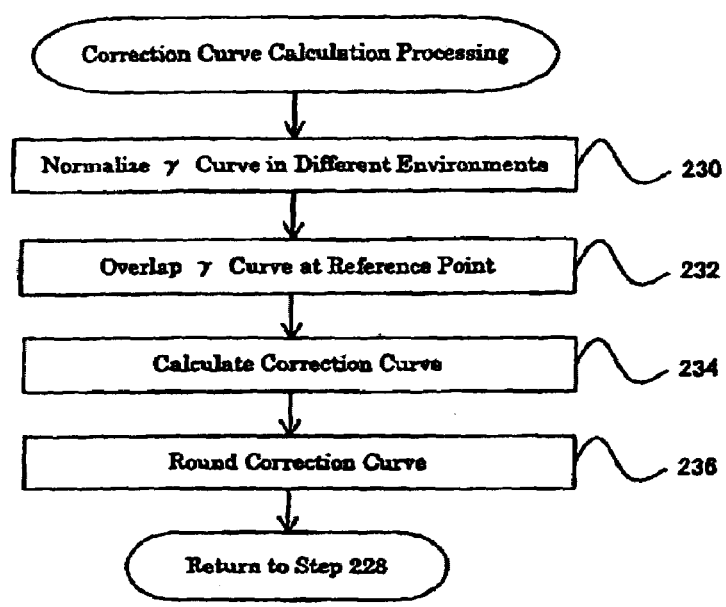
FIG. 11 is a flowchart describing calculation of a correction curve by the 2nd color correction table generator 150 in an embodiment of the present invention.

The following section describes calculation of the correction curve by the color correction table generator 150 in the projector (processing in the step 226 in FIG. 10) according to an embodiment of the present invention while referring to FIG. 11. The correction curve is obtained as follows based on the luminance of the reflected light on the screen for the white output from the projector, which is stored in the device characteristic storage memory 160, and the measured value obtained in step 222 in FIG. 10.

In the correction curve calculation processing, γ curves are normalized in different circumstances (step 230). Correction curves in all of W (white), R (red), G (green), and B (blue) are the same curves, and therefore, in this embodiment a correction curve is calculated with respect to W as an example. γ curves in different circumstances (in a dark room and in an illuminated surround) are assumed as follows. The "γ" represents a gradation characteristic of the projector concerned. The value of γ is obtained by actually measuring the gradation characteristic of the projector concerned and it is suitable to use a average value as the value of γ. In this embodiment, γ is set equal to 2.2 as an example.

In a dark room:

$$Fd(Din)=Yw \cdot Din^\gamma \quad (1)$$

Figure 12:
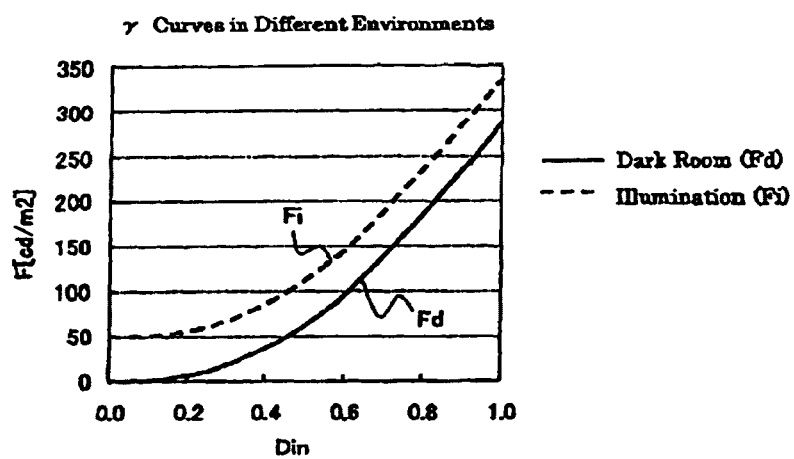
FIG. 12 is a graph showing $\gamma$ curves in different circumstances

In an illuminated surround:

$$Fi(Din)=Yw \cdot Din^\gamma + Yi \quad (2)$$

γ curves in different circumstances are shown in FIG. 12.

In the above equations, F represents a total luminance of lights reflected by the screen, Din represents normalized values 0–1 by normalizing digital input values (0–255 in gradation) of RGB, Yw represents the luminance of white d the projector, and Yi represents the luminance of illumination. Then, the equations (1) and (2) are normalized under the assumption that the eyes adapt themselves to luminances (Yw in a dark room, Yw+Yi in an illuminated surround) detected when the projector outputs white in different circumstances. That is, the equations (1) and (2) are normalized so that the luminance (Yw in a dark room, Yw+Yi in an illuminated surround) detected when the projector outputs white in each of different circumstances becomes 1. More specifically:

In a dark room:

$$F'd(Din)=Fd(Din)/Yw=Din^\gamma \quad (3)$$

In an illuminated surround:

$$F'i(Din)=Fi(Din)/(Yw+Yi)=(Yw \cdot Din^\gamma + Yi)/(Yw+Yi) \quad (4)$$

Figure 13:
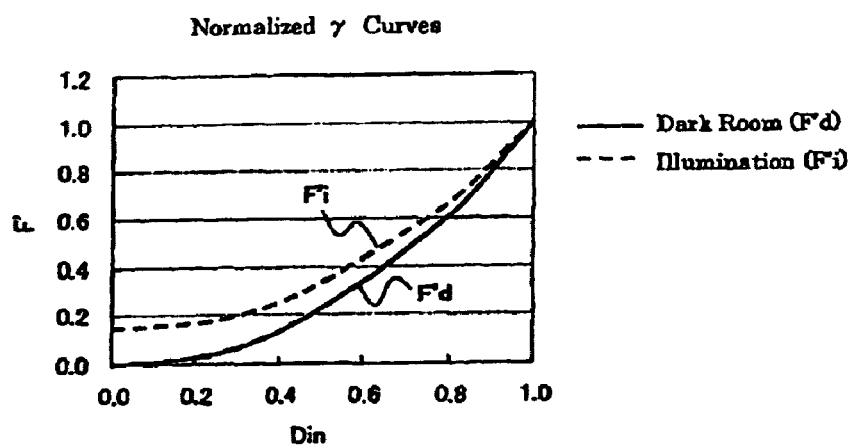
FIG. 13 is a graph showing normalized $\gamma$ curves in different circumstances.

Normalized γ curves in different circustances are shown in FIG. 13.

Figure 14:
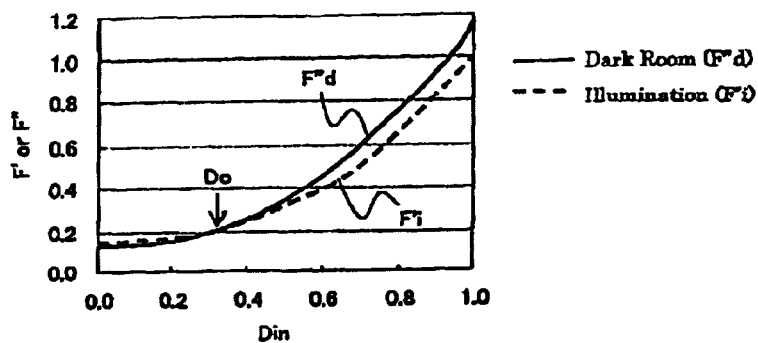
FIG. 14 is a graph showing a state in which normalized $\gamma$ curves in different circumstances are overlapped together at a reference point Do.

Next, the γ curves are overlapped each other at a reference point Do (step 232). As shown in FIG. 14, F'd(Din) is shifted in parallel in F' axis direction by only {F'i(Do)−F'd(Do)} so that F'd(Din) takes the same value as F'i(Din). More specifically:

$$F''d(Din) = F'd(Din) + \{F'i(Do) - F'd(Do)\}$$
$$= F'd(Din) - F'd(Do) + F'i(Do)$$

If the equations (3) and (4) are used:

$$F''d(Din)=Din^\gamma - Do^\gamma + (Yw \cdot Do^\gamma + Yi)/(Yw+Yi) \quad (5)$$

Then, using the equation (5), a correction curve is calculated (step 234).

Thus, in this embodiment, as shown in FIG. 14, a correction curve is formed so that an output value of the γ curve in an illuminated surround coincides with an output value of the γ curve in a dark room in the vicinity of the reference point Do.

Then, the change in color of output image, which depends on whether an external illumination is present or not, is diminished by correcting input gradation values so that a relative contrast (gradient of γ curve) in the vicinity of the reference point Do does not change depending on whether an external illumination is present or not.

The above can be expressed by the following equation:

$$F''i(Dout)=F''d(Din) \quad (6)$$

where Dout represents input gradation values after correction.

Substitution of equations (4) and (5) for equation (6) gives:

$$(Yw \cdot Dout^\gamma + Yi)/(Yw+Yi)=Din^\gamma - Do^\gamma + (Yw \cdot Do^\gamma + Yi)/(Yw+Yi)$$

Thus, $$Dout=[(1+Yi/Yw)Din^\gamma - (Yi/Yw)Do^\gamma]^{1/\gamma} \quad (7)$$

Figure 15:
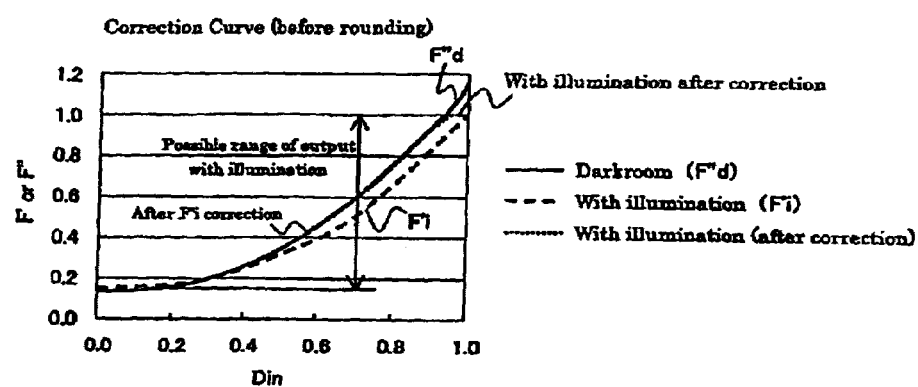
FIG. 15 is a chart describing correction applied to an output characteristic after the correction.

Note that since there is a limit for the luminance range for the output ($0 \leq F''d(Din) \leq 1$) as shown in FIG. 15, correction is applied so as to provide an output shown in FIG. 15.

Consequently, when Dout<0,
Dout=0, and
when Dout>1,
Dout=1.

Figure 19:
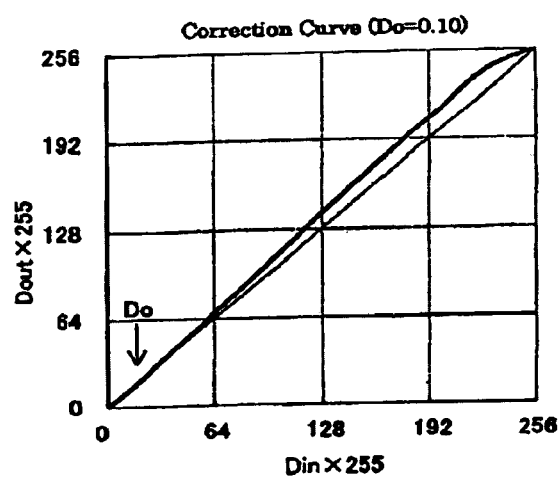
FIG. 19 is a graph (1) showing an example of a correction curve obtained by changing the value of Do.
Figure 20:
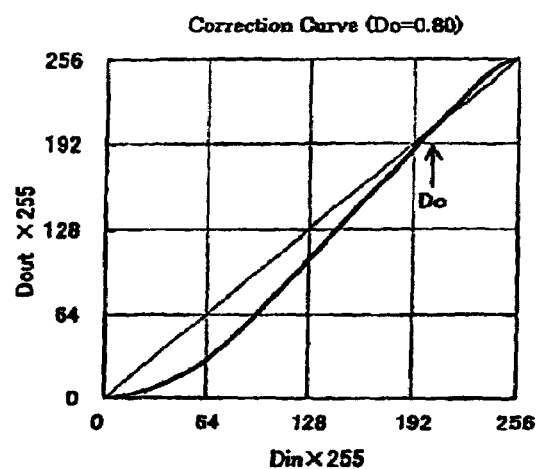
FIG. 20 is a graph (2) showing an example of a correction curve obtained by changing the value of Do.

The correction curve changes variously by changing the gradation Do which serves as a main factor in correcting a lowering of contrast caused by illumination. Generally, if the value of Do is small, there is obtained such a correction curve as shown in FIG. 19, and although the gradation in a low gray scale region is improved, the projection screen looks whitish, affording a light tone. On the other hand, if the value of Do is made large, there is obtained such a correction curve as shown in FIG. 20, in which the projection screen is blackish as a whole and the gradation change in the low gray scale region further decreases (what is called collapse of the low gray scale region becomes conspicuous). By setting the value of Do at an appropriate value, it is possible to make such a correction as contrast is most emphasized with little change in the entire brightness of projected image as compared with that before correction. As a result of experimental evaluation, it turned out that a Do value near a middle gray scale ($0.25 \leq Do \leq 0.50$ or so) was suitable.

Figure 16:
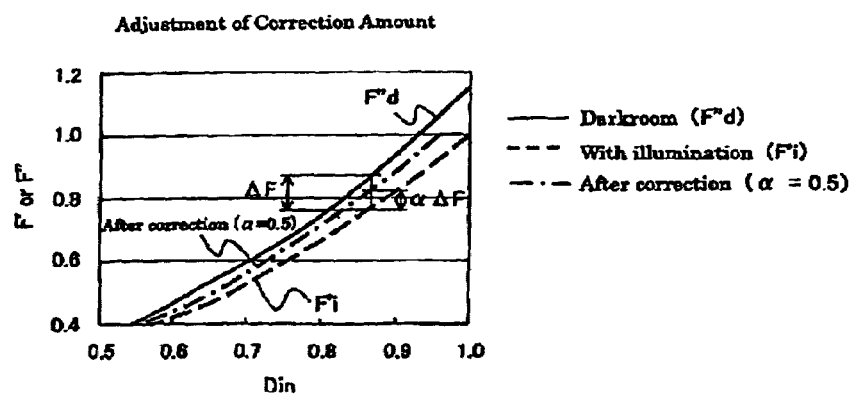
FIG. 16 is a chart describing adjustment for the correction amount of the correction curve.

Further, as shown in FIG. 16, the amount of correction can be adjusted by multiplying the amount of correction $\Delta F$ by $\alpha$ ($0 \leq \alpha \leq 1$). This is for preventing an unnatural image reproduction caused by an excessive correction. The equation (7) of Dout in adjusting the amount of correction becomes as follows:

$$Dout=[(1+\alpha Yi/Yw)Din^\gamma-(\alpha Yi/Yw)Do^\gamma]^{1/\gamma} \quad (7')$$

Therefore, multiplying the amount of correction by $\alpha$ eventually corresponds to multiplying the luminance of illumination, Yi, by $\alpha$.

It is preferable that the value of $\alpha$ be within the range of $0.8 \leq \alpha \leq 1$.

Then the correction curve is rounded (step 236).

Figure 17:
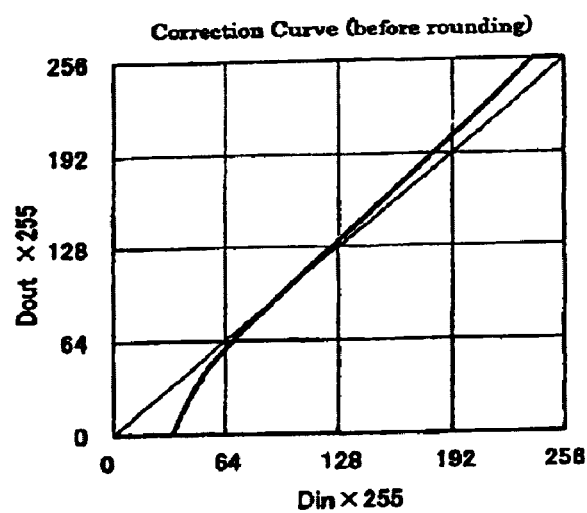
FIG. 17 is a chart showing a relationship between Dout and Din.

FIG. 17 shows a relationship between Dout and Din represented by an equation (7) or equation (7') in FIG. 17. As FIG. 17 shows, though the correction curve is constituted so as to emphasize the contrast as a whole, since the gradation disappears around Dout=0 and Dout=1 on the color correction curve shown in FIG. 17, the disappearance of the gradation around Dout=0 and Dout=1 is prevented by rounding the correction curve.

1) Rounding for Reducing Correction Amount

First, to perform where Dout stays at 0 or 1 without gradation, the correction amount $\Delta D$ is reduced by converting the correction amount $\Delta D$=Dout−Din as follows.

$$\Delta D \rightarrow \Delta D - (\Delta D)^\beta \quad (8)$$

Figure 18:
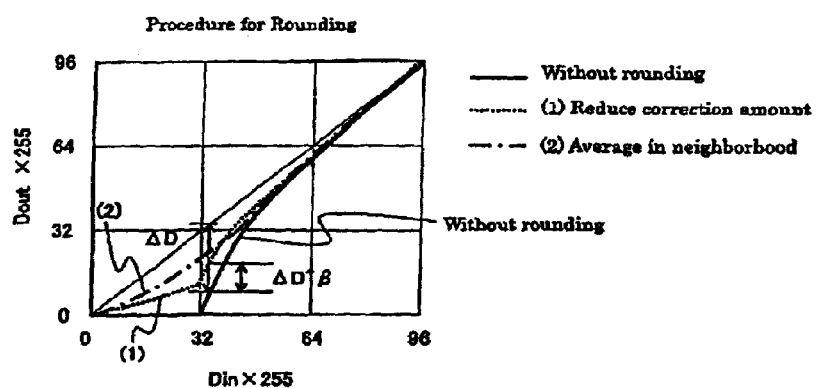
FIG. 18 describes rounding the correction curve.

With this conversion, since the reduction of the correction amount increases as the correction amount becomes larger as shown in FIG. 18, the correction curve is rounded consequently. $\beta$ in the equation (8) is a parameter representing the degree of the rounding, the rounding is not conducted when $\beta$=0, and Dout=Din when $\beta$=∞. A preferable value for $\beta$ is about 1.5. A curve (1) in FIG. 18 shows a relationship between Dout and Din when the rounding is applied to reduce the correction amount.

2) Rounding with Neighborhood Averaging

Since a sharp angle remains on the correction curve (1) in FIG. 18, averaging neighborhood is conducted for individual points further Specifically, the gradation data are calculated as 33 points (Din×255=0, 8, 16, . . . , 255), and then, total of five points including previous and following two points are averaged at the individual points. As a result of the process above, a correction curve is generated without gradation where Dout stays at 0 or 1.

When the correction curve is calculated, four parameters comprising $\gamma$ of the projector, a reference point Do, a correction amount $\alpha$, and the parameter for rounding $\beta$ are necessary. Various correction curves are generated with the same calculation method by adjusting these values.

(3) Color Correction in 3rd Color Corrector 130

Figure 21:
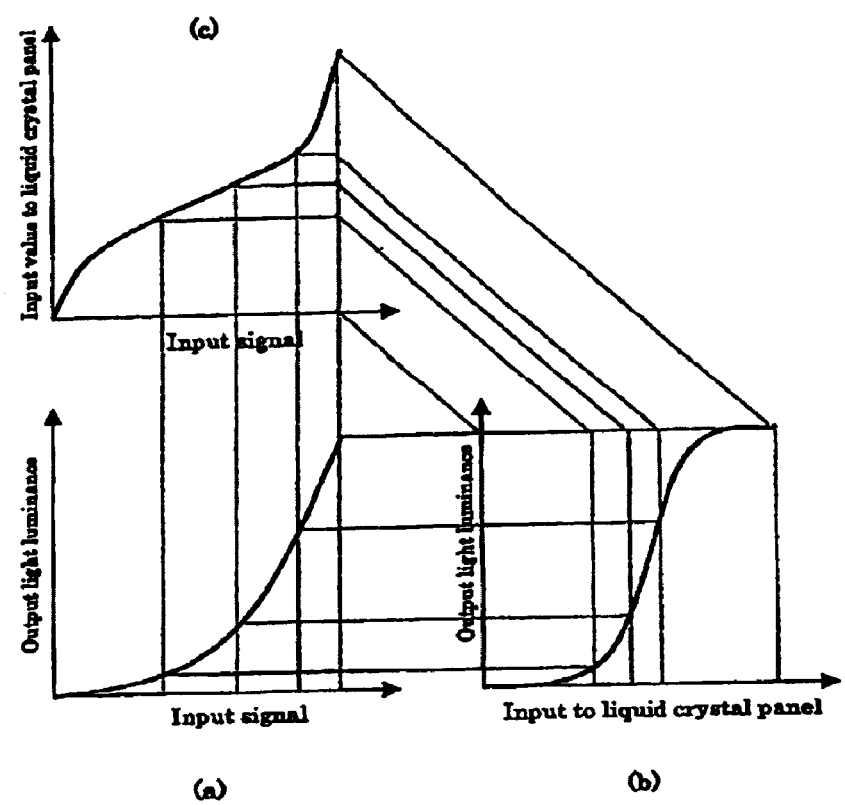
FIG. 21 describes color correction by a 3rd color corrector 130.

The following section describes the color correction by the 3rd corrector 130 while referring to FIG. 21.

The output characteristic of the projector is set as shown in FIG. 21(*a*), and an input/output characteristic of the liquid crystal panel is measured as shown in FIG. 21(*b*). Then, a correspondence between the input signal and the input value to the liquid crystal panel is obtained based on the FIGS. 21(*a*) and (*b*) as shown in FIG. 21(*c*).

The 3rd color corrector 130 adjusts the input value to the liquid crystal panel while referring to a color correction table representing the correspondence between the input signal and the input value to the liquid crystal panel shown in FIG. 21(*c*). The color correction tables are stored for the individual projectors in advance.

What is claimed is:

1. An image display device for applying a desired image processing on inputted image data, and displaying an image, comprising:

a first color correction unit for applying desired color correction to said inputted image data while referring to a three-dimensional color correction table so as to match a color characteristic of said image display device with a reference color characteristic based on a characteristic value of said image display device;

a second color correction unit for applying desired color correction to said inputted image data while referring to a one-dimensional color correction table for correcting tone characteristic of said image display device in accordance with a surrounding environment; and a first rewriting unit for rewriting said three-dimensional color correction table so as to allow said first color correction unit to correct color characteristic of said image display device in accordance with a surrounding environment.

2. The image display device according to claim 1 further comprising a second rewriting unit for rewriting said three-dimensional color correction table so as to allow said first color correction unit to correct grid point data in said three-dimensional color correction table based on said characteristic value.

3. The image display device according to claim 1, wherein the one-dimensional color correction table for said second color correction unit is used for correction for a change of brightness of external illumination.

4. The image display device according to claim 1, wherein the three-dimensional color correction table for said first color correction unit is used for correction for a change of color on a plane of projection.

5. The image display device according to claim 1, wherein the three-dimensional color correction table for said first color correction unit is used for correction for a change of color of an external illumination.

6. The image display device according to claim 1 further comprising a unit for entering said characteristic value.

7. The image display device according to claim 1, wherein said image display device is a projector.

8. The image display device according to claim 1, wherein said second rewriting unit does not rewrite the grid point data when said characteristic value is a reference characteristic value.

9. The image display device according to claim 1, wherein if said inputted image data are converted to the outside of a color gamut when the desired image processing is applied while referring to the three-dimensional color correction table rewritten by said first rewriting unit, said inputted image data are converted to the inside of the color gamut by reducing correction amounts while the ratio of changes of individual color components are maintained.

10. An image processing method for applying a image processing on image data inputted to a display device, comprising:

a first color correction step for applying desired color correction to said inputted image data while referring to a three-dimensional color correction table so as to match a color characteristic of said image display device with a reference color characteristic based on a characteristic value of said image display device;

a second color correction step for applying desired color correction to said inputted image data while referring to a one-dimensional color correction table for correcting tone characteristic of said image display device in accordance with a surrounding environment; and a first rewriting step for rewriting said three-dimensional color correction table so as to allow said first color correction step to correct color characteristic of said image display device in accordance with a surrounding environment.

11. A computer-readable medium having a program of instructions for execution by the computer to perform a image processing with respect to image data inputted to a display device, said program comprising:

a first color correction processing for applying desired color correction to said inputted image data while referring to a three-dimensional color correction table so as to match a color characteristic of said image display device with a reference color characteristic based on a characteristic value of said image display device;

a second color correction processing for applying desired color correction to said inputted image data while referring to a one-dimensional color correction table for correcting tone characteristic of said image display device in accordance with a surrounding environment; and a first rewriting processing for rewriting said three-dimensional color correction table so as to allow said first color correction processing to correct color characteristic of said image display device in accordance with a surrounding environment.

* * * * *